United States Patent Office 3,027,375
Patented Mar. 27, 1962

3,027,375
NEW VAT DYES
William Baptist Hardy, Bound Brook, and Robert Edmund Herd, Metuchen, N.J., assignors to American Cyanamid Company, New York, N.Y., a corporation of Maine
No Drawing. Filed June 8, 1953, Ser. No. 360,333
10 Claims. (Cl. 260—274)

This invention relates to new vat dyestuffs having the following ring structure:

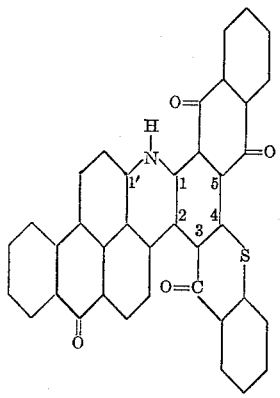

This ring system, Bz-1'-(1-anthraquinonylamino)benzanthrone-2',2-acridine-3,4-thioxanthone, will be referred to, for simplicity, in the specification as anthraquinonylamino benzanthrone acridine thioxanthone. Either the thioxanthone ring or the other rings may be substituted by halogen, alkyl, aryl, alkoxy, aryloxy, alkylsulfonyl, or phthaloyl groups.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War observation by means of infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes, when observed under infrared radiation, for example by means of devices such as snooperscopes and sniperscopes, stood out against the average terrain, making discovery easy and presenting excellent targets.

Extensive investigations have shown that to be effective under infrared observation dyed fabrics must show an infrared reflectance which is relatively low, preferably below 25%, but which of course should not be too low. In other words, in average terrain a soldier to be effectively concealed, or to present a poor target, should appear no lighter than the background and, while it is undesirable that a soldier should appear much darker, any difference in infrared reflectance from that of the terrain should be on the darker side rather than on the lighter side.

There are known some dyes, for example some sulfur dyes, which exhibit some low infrared reflectance. These dyes, however, have such inferior fastness to light and to the rather drastic washing conditions in the field that they are not practical. On the other hand, vat dyes which show satisfactory light and wash fastness have in the past also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

The dyestuffs of the present invention are of low infrared reflectance and are sufficiently fast to light and washing so that they meet permanent standards under military field conditions. In fact, the infrared reflectance is so low that they are useful in blends with other vat dyestuffs of higher infrared reflectance to produce desired shades which have an over-all reflectance sufficiently low for practical use.

The dyestuffs may be prepared by ring closure of the anthrimide obtained by condensing a Bz-1-halogen benzanthrone with 4-aminoanthraquinone thioxanthone and its derivatives. These anthrimides are in themselves new compounds. The preparation is shown by the following series of equations:

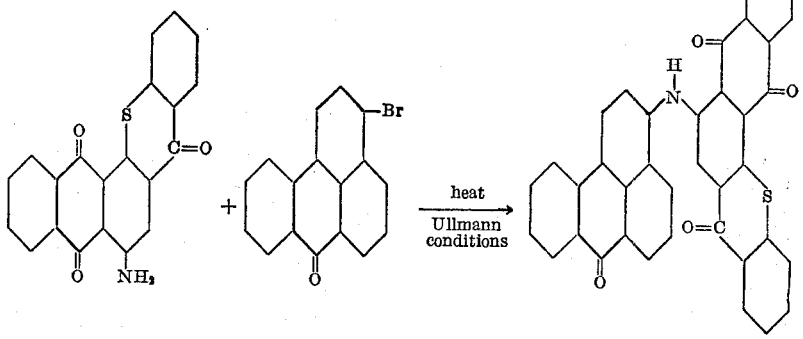

3

↓

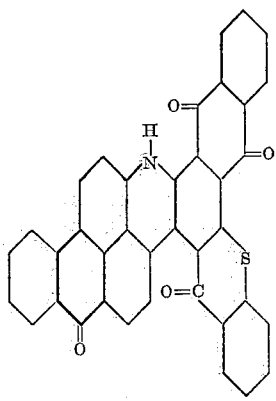

The aminoanthraquinone thioxanthones may in turn be prepared from 1-amino-4-halogen anthraquinone by condensation with the appropriate thiosalicylic acid. It is also possible to prepare some derivatives by direct substitution, for example, halogen derivatives may be prepared by reaction of chlorine or sulfuryl chloride on the benzanthrone anthraquinone acridine thioxanthone dye. In a similar manner, bromo derivatives may be obtained by direct bromination.

The present invention is not limited to compounds prepared as referred to above. Any other suitable processes of preparation may be employed. However, these methods operate readily and constitute the preferred process modifications which are included within the scope of the invention.

It is an advantage that the various steps in the synthesis of the dyes of the present invention proceed smoothly and with good yield. They also do not require new techniques. Thus, for example, the alkali fusion is carried out under conditions similar to those used for the formation of other benzanthrone anthraquinone acridines. In general, the alkali fusion step is effected in caustic alkali, preferably caustic potash and sufficient alcohol to form a reaction mixture of satisfactory physical properties. Any of the lower paraffin alcohols may be used.

The invention will be described in greater detail in conjunction with the following specific examples, in which the parts are by weight unless otherwise specified.

*Example 1*

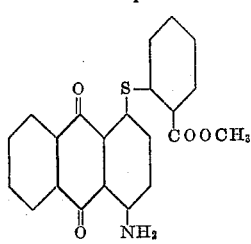

60 parts of 1-amino-4-chloroanthraquinone, 47 parts of methylthiosalicylate, 40 parts of sodium carbonate, 10 parts of cuprous chloride, and 1,000 parts of amyl alcohol are heated under reflux with good stirring for twenty hours. The mixture is then poured into water and the amyl alcohol is distilled off with steam. After cooling to 30° C. the slurry is diluted with water and 500 parts of concentrated hydrochloric acid is added with good stirring and the brick-red product is filtered and washed free of acid. An excellent yield of the sulfide corresponding to the formula is obtained.

*Example 2*

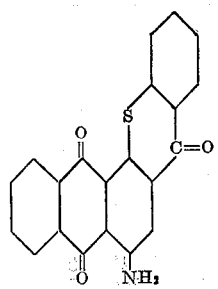

22.5 parts of the product of Example 1 are added to 720 parts of chlorosulfonic acid at 10° C. The solution is stirred for approximately 20 hours with the temperature being allowed to rise to 30° C. The reaction mixture is then treated with 95% sulfuric acid, drowned in water and ice, and then filtered. The dry product, a bright blue solid, is obtained in essentially quantitative yield. If desired, this product can be purified by recrystallization from nitrobenzene.

*Example 3*

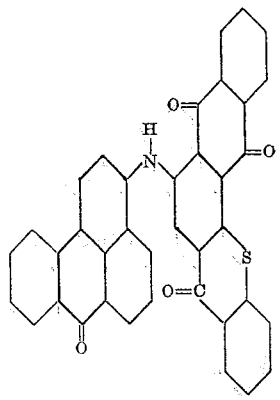

10 parts of 4-aminoanthraquinone thioxanthone (product of Example 2), 11 parts of bromobenzanthrone, 2.7 parts copper acetate, 16.5 parts sodium acetate and 380 parts of nitrobenzene are stirred and heated under reflux for several hours. The brownish solid is then filtered off at 100° C. and washed with nitrobenzene and pyridine and finally with ethanol. The inorganic salts are then removed by stirring with hot 20% hydrochloric acid and filtering. The product obtained in this manner is sufficiently pure to use as it is. If further purification is desired, the product may be extracted with a hot organic solvent such as pyridine.

*Example 4*

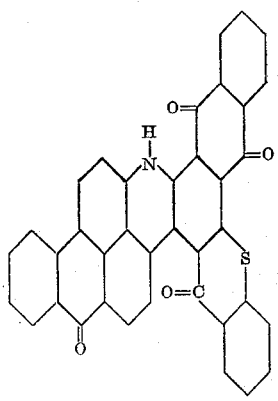

A melt is made up of 44 parts of methanol and 61 parts of flake potassium hydroxide. 6.8 parts of the product of Example 2 is added and the melt is stirred at 125° C. until color tests indicate the reaction is substantially complete. The melt is then poured into water and ice and aerated to generate the oxo form of the vat dye. The dyestuff thus obtained is a brownish solid which dissolves to a cherry red color in sulfuric acid and dyes cotton from a bluish vat brown shades. These dyeings exhibit extraordinarily high absorption in the infrared regions of the spectrum.

Example 5

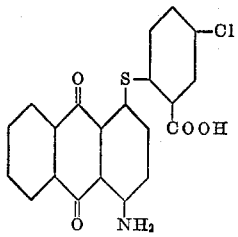

20 parts of 5-chlorothiosalicylic acid (prepared by reacting the diazo from 5-chloroanthranilic acid with sodium disulfide and reducing the resulting dichlorodicarboxydiphenyldisulfide with zinc in acetic acid solution), 24.8 parts of 1-amino-4-chloroanthraquinone, 28.2 parts of sodium carbonate, 4.1 parts of cuprous chloride, and 400 parts of amyl alcohol are heated at reflux in a nitrogen atmosphere until reaction is complete. The amyl alcohol is steam distilled from the reaction mixture. The product remaining after removal of the amyl alcohol is poured into a large volume of hot water and clarified. The clear filtrate is acidified and the red solid which precipitates is filtered off, washed and dried to give an excellent yield of the anthraquinonyl sulfide having the structure shown.

Example 6

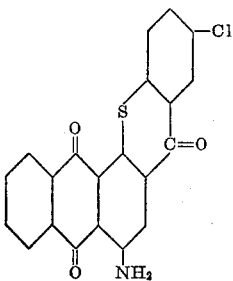

27 parts of the product of Example 5 are added to 750 parts of chlorosulfonic acid. The reaction is then carried out as described in Example 3. The 4-aminoanthraquinone chlorothioxanthone obtained in this manner is a blue solid having only slight solubility in most organic solvents.

Example 7

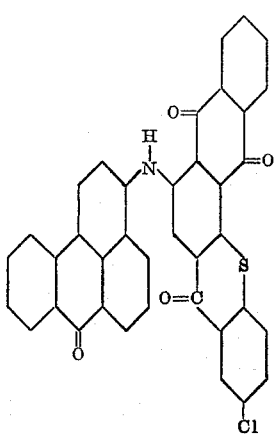

10 parts of the product of Example 6, 11.8 parts of bromobenzanthrone, 0.7 part of cuprous bromide, 8.6 parts of potassium carbonate and 320 parts of naphthalene are heated in a nitrogen atmosphere at reflux temperature until the condensation is substantially complete. The reaction mixture is diluted with 340 parts of ortho-dichlorobenzene, filtered, and the product washed with ortho-dichlorobenzene. The anthrimide is obtained in excellent yield and in high purity. It is a dull greenish solid dissolving in concentrated sulfuric acid with an olive color. It is very slightly soluble in most organic solvents.

Example 8

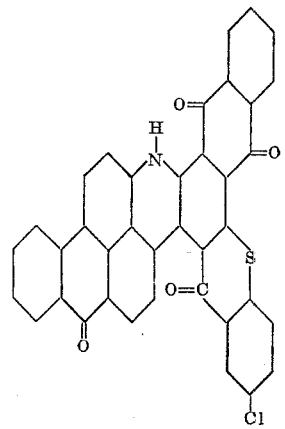

A melt consisting of 50 parts ethanol and 31 parts of potassium hydroxide is prepared by heating the two reagents at 105° C. 6 parts of the product of Example 7 are added and the melt is held at approximately 105–110° C. until color tests indicate that the reaction is completed. The blue cast melt is drowned in 600 parts of ice and water and air is passed through to generate the dyestuff. The dye is filtered off and washed free of alkali and dried. An excellent yield of a brownish cast solid is obtained. This product dissolves with bright red color in sulfuric acid and dyes textiles from a bluish vat a yellow-brown shade. The dyeings are outstanding in their ability to absorb light in the infrared region of the spectrum.

Example 9

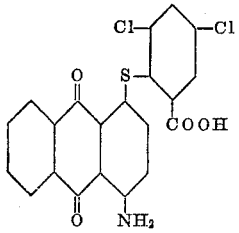

20.8 parts of 3,5-dichlorothiosalicylic acid (melting at 210° C. and prepared as described in Example 5 for the monochlorothiosalicylic acid) are condensed with 22 parts of 1-amino-4-chloroanthraquinone using the conditions outlined in Example 5.

Example 10

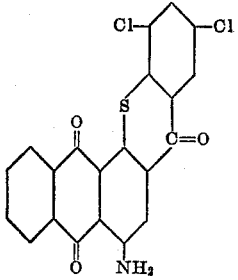

25 parts of the product of Example 9 are stirred with 700 parts of chlorosulfonic acid following the procedure of Example 2. The product is a blue solid dissolving to

Example 11

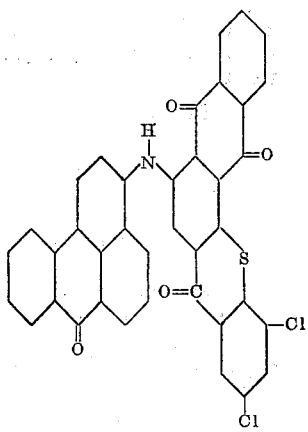

5.7 parts of the product of Example 10 are condensed with 6.2 parts of bromobenzanthrone under the same conditions described in Example 7. The olive-colored product is isolated in good yield.

Example 12

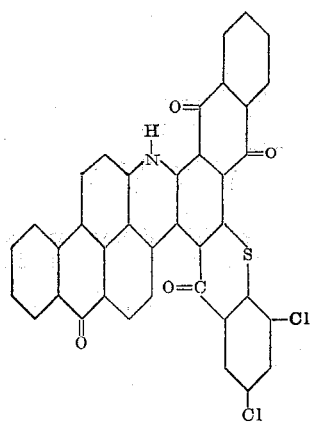

5.7 parts of the product of Example 11 are fused in a melt comprised of 29 parts of potassium hydroxide and 50 parts of ethanol. The melt is stirred at 105° C. for about two hours to effect the reaction. The product is then isolated as described in Example 4. Cotton is dyed brown shades from a bluish vat. The dyeings show excellent absorption in the infrared regions of the spectrum.

Example 13

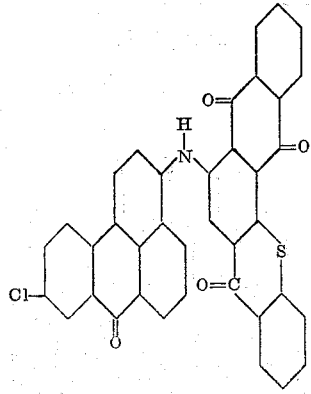

15.5 parts of 6-chloro-Bz-1-bromobenzanthrone, 16.1 parts of 4-aminoanthraquinone thioxanthone (product of Example 2), 1 part of cuprous bromide, 15 parts of potassium carbonate and 500 parts of nitrobenzene are stirred and heated at 180° C. until anthrimide formation is substantially complete. The reaction mixture is cooled and the product is filtered with suction. The cake is then extracted with 1,000 parts of boiling pyridine and washed thoroughly with alcohol. The alcohol wet cake is slurried in 2,000 parts of dilute boiling hydrochloric acid, filtered and washed acid free. The chloroanthrimide corresponding to the above formula is obtained in good yield.

Example 14

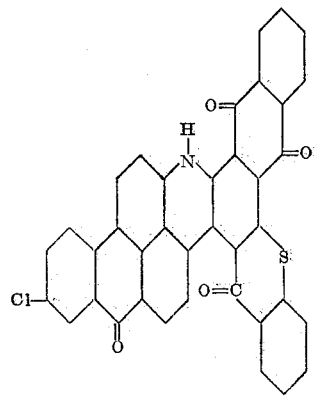

A melt comprised of 210 parts of methanol and 270 parts of flake potassium hydroxide is heated at 120° C. To this melt are added 18.8 parts of the product of Example 13. After stirring for approximately two hours, the violet cast melt is drowned into 6,000 parts of ice and water and aerated to regenerate the dye. This dye can be further purified by extraction with pyridine if desired. It dyes cotton in brown shades from a violet vat. Dyeings have good fastness properties and high infrared absorption.

Example 15

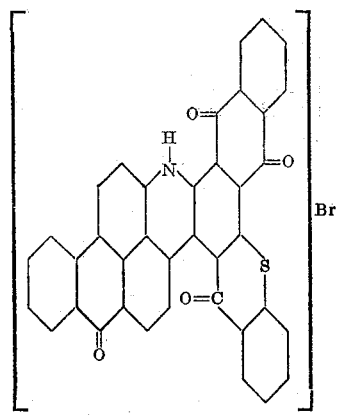

20 parts of the thioxanthone acridine dye of Example 4, 4 parts of bromine, 18.9 parts of sodium acetate, 0.2 part of iodine and 151 parts of acetic acid are stirred and heated at reflux for several hours. The reaction mixture is then cooled and the product is then filtered off. An essentially quantitative yield of olive cast powder is obtained which contains approximately one bromine atom per molecule. Cellulose fibers are dyed in olive-brown shades of good fastness and good infrared absorption by this dye.

Example 16

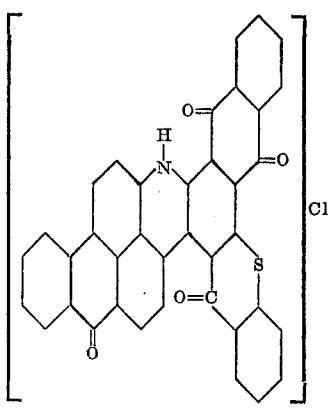

A mixture comprised of 29 parts of the product of Example 4, 500 parts of nitrobenzene, 27 parts of sulfuryl chloride and 2 parts of iodine is stirred and heated at 90–100° C. for several hours. 500 parts of ethanol are added and the mixture is refluxed for a few minutes. The product is then isolated by filtration at room temperature followed by washing with alcohol. An essentially quantitative yield of product containing approximately one chlorine atom per molecule is obtained. This dye colors cellulose fibers in olive-brown shades of good fastness and low infrared reflectance.

We claim:
1. A Bz-1'-(1-anthraquinonylamino)benzanthrone-2',2-acridine-3,4-thioxanthone.
2. A compound of the formula:

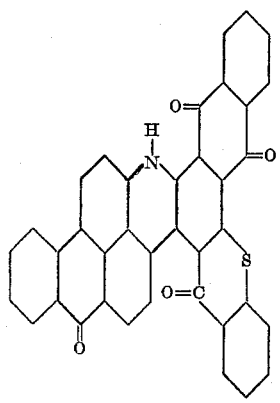

3. The compound of the formula:

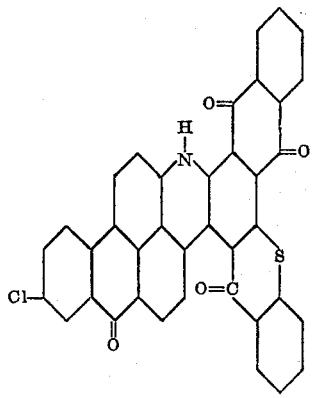

4. The compound of the formula:

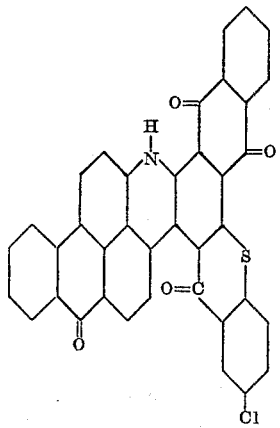

5. The compound of the formula:

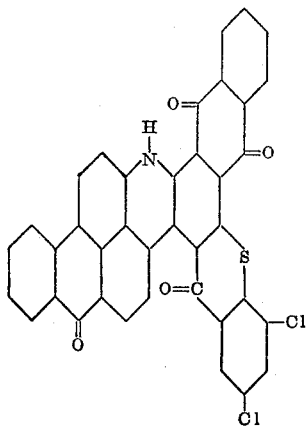

6. The process of heating a 2-(Bz-1-benzanthronyl-amino)-3,4-phthaloyl thioxanthone with a caustic alkali above 100° C.

7. The process of heating the compound

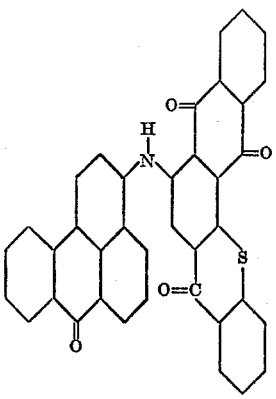

with a caustic alkali above 100° C.

8. The process of heating the compound
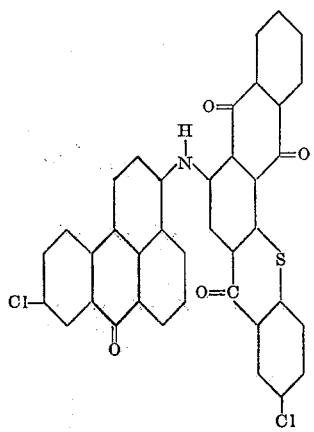
with a caustic alkali above 100° C.
9. The process of heating the compound
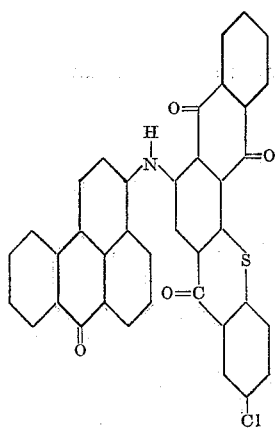
with a caustic alkali above 100° C.
10. The process of heating the compound
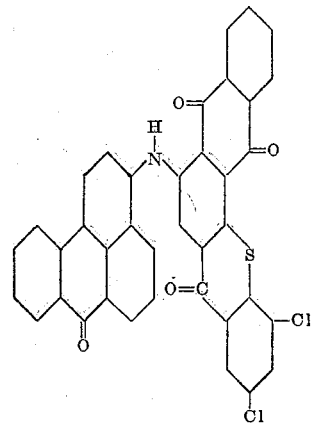
with a caustic alkali above 100° C.
References Cited in the file of this patent
UNITED STATES PATENTS
2,530,010    Fioroni _____ Nov. 14, 1950
OTHER REFERENCES
Gilman: "Organic Chemistry," vol. 1, pages 75–76, 2nd ed., John Wiley and Sons.